United States Patent
Fischer et al.

(10) Patent No.: US 11,347,716 B1
(45) Date of Patent: May 31, 2022

(54) SYSTEMS AND METHODS FOR ESTABLISHING AND ENFORCING RELATIONSHIPS BETWEEN ITEMS

(71) Applicant: Palantir Technologies Inc., Palo Alto, CA (US)

(72) Inventors: Jack Fischer, Briarcliff Manor, NY (US); Advaith Anand, Austin, TX (US); Andrew Jiang, San Jose, CA (US); Christopher Dugan, Bronx, NY (US)

(73) Assignee: Palantir Technologies Inc., Denver, CO (US)

( * ) Notice: Subject to any disclaimer, the term of this patent is extended or adjusted under 35 U.S.C. 154(b) by 688 days.

(21) Appl. No.: 16/250,810

(22) Filed: Jan. 17, 2019

Related U.S. Application Data

(60) Provisional application No. 62/772,005, filed on Nov. 27, 2018.

(51) Int. Cl.
*G06F 16/23* (2019.01)
*G06F 3/0484* (2022.01)
*G06F 3/0482* (2013.01)

(52) U.S. Cl.
CPC ........ *G06F 16/2365* (2019.01); *G06F 3/0482* (2013.01); *G06F 3/0484* (2013.01)

(58) Field of Classification Search
CPC ... G06F 16/2365; G06F 3/0484; G06F 3/0482
See application file for complete search history.

(56) References Cited

U.S. PATENT DOCUMENTS

| | | | |
|---|---|---|---|
| 7,107,268 B1* | 9/2006 | Zawadzki | G06Q 10/06 |
| 10,037,339 B1* | 7/2018 | Kleinpeter | G06F 9/547 |
| 2008/0028001 A1* | 1/2008 | Erl | G06F 8/20 |
| 2009/0288018 A1* | 11/2009 | Paliwal | G06Q 10/06 |
| | | | 715/751 |
| 2011/0213631 A1* | 9/2011 | Mislavsky | G06Q 10/063 |
| | | | 705/7.11 |
| 2017/0004449 A1* | 1/2017 | Hubbard | G06Q 10/063114 |
| 2017/0019487 A1* | 1/2017 | Maheshwari | H04L 41/22 |
| 2017/0046374 A1* | 2/2017 | Fletcher | G06F 3/0482 |
| 2018/0025011 A1* | 1/2018 | Aksionkin | G06F 16/211 |
| | | | 707/692 |
| 2019/0042950 A1* | 2/2019 | Lin | G06F 11/3438 |
| 2019/0042951 A1* | 2/2019 | Lin | G06F 16/9024 |

* cited by examiner

*Primary Examiner* — Robert W Beausoliel, Jr.
*Assistant Examiner* — Susan F Rayyan
(74) *Attorney, Agent, or Firm* — Sheppard Mullin Richter & Hampton LLP

(57) ABSTRACT

Systems and methods are provided for tracking and enforcing relationships between items. A relationship interface may be provided that conveys the relationship (or link) between items, and through which a user may define the link between two or more items. Identifying a link between two items may establish a set of one or more rules to be enforced with respect to the use of one or both of the items (e.g., when the items are stored, when the items are used to create other items, when other items are associated with the items). In various embodiments, violations of one or more rules may be identified and provided via the user interface. In some embodiments, new items that conflict with one or more rules may be prevented from being committed.

20 Claims, 6 Drawing Sheets

SYSTEMS AND METHODS FOR ESTABLISHING AND ENFORCING RELATIONSHIPS BETWEEN ITEMS

CROSS REFERENCE TO RELATED APPLICATIONS

This application claims the benefit under 35 U.S.C. § 119(e) of U.S. Provisional Application Ser. No. 62/772,005 filed Nov. 27, 2018, the content of which is incorporated by reference in its entirety into the present disclosure.

TECHNICAL FIELD

This disclosure relates to approaches for tracking and enforcing relationships between items in a system.

BACKGROUND

Under conventional approaches, tracking and enforcing relationships between items (e.g., dataset, application, folder, report, resource) stored or used in a system may be difficult. For example, a set of data utilized by a system may depend from, be derived from, form the basis of, and/or otherwise be connected to one or more other sets of data stored by the system. As individuals or entities with access to the system perform analysis on the data and/or add additional data or resources related to the data already stored, relationships between data become increasingly difficult to track and visualize. Similarly, enforcing policies based on the provenance of data or relationship between multiple datasets may be time-consuming and labor intensive. For example, the dependence of a first dataset on one or more other datasets may result in errors in the first dataset due to violations in the provenance and/or relationships of those other dataset(s). As additional datasets or resources are generated based on the first dataset, the problem may become exacerbated. Typically, these issues are increasingly compounded as systems grow and the relationships between the data stored in the system become more difficult to track. These and other drawbacks exist with conventional solutions.

SUMMARY

A claimed solution rooted in computer technology overcomes problems specifically arising in the realm of computer technology. Various embodiments of the present disclosure may include systems, methods, and non-transitory computer readable media configured to track and enforce relationships between items. A relationship interface may be provided that conveys the relationship (or link) between items. For example, an item may comprise a dataset, an application, a folder, a report, a resource, and/or one or more other types of data or tool. In various embodiments, a user may define the link between two or more items via the relationship interface. For example, a selectable list of predefined link types may be provided to enable a user to define the relationship between two or more items. As another example, a graphical tool may be provided to enable a user to define the relationship between two or more items by visually connecting the items (e.g., drawing lines between items). Identifying a link between two items may establish a set of one or more rules to be enforced with respect to the use of one or both of the items (e.g., when the item(s) are stored, when the item(s) are used to create other item(s), when other items are associated with the item(s)). In various embodiments, violations of one or more rules may be identified and provided via the user interface. In some embodiments, a new data object that conflicts with one or more rules may be prevented from being committed.

In various embodiments, the systems, methods, and non-transitory computer readable media are configured to provide a relationship interface comprising a visualization of items in a system and the relationships between those items. An item may comprise and/or represent one or more datasets (e.g., raw upload datasets, ingests from other systems, datasets derived from raw uploads, analyzed datasets, and/or other datasets), artifacts of datasets, data catalogs, data paths, spreadsheets, timeseries, ontology objects, reports, use cases, projects, systems, folders, applications, data sources and/or other resources, and/or other types of data objects or tools. In some implementations, an item may comprise, or serve as a representative placeholder for, an individual user, a set of users, a predefined group of users, one or more users having particular characteristics, and/or one or more other individuals or groups of individuals. The relationship interface may be configured to display a visual representation of the plurality of items. The items displayed may be determined based on the identification of the user accessing the relationship interface and/or based on user input received via the relationship interface. Through the relationship interface, the relationships between the items displayed may be identified, tracked, and/or enforced.

In various embodiments, the systems, methods, and non-transitory computer readable media are configured to facilitate the identification of links between the items. A link between items may define the relationship between those items. The identification of links between items may establish one or more rules to be enforced with respect to usage of the items. Based on the links identified between one or more of a set of items, a user may utilize the relationship interface to visualize and manually indicate how items within a system are interrelated. In some embodiments, user input identifying a link between at least two items may comprise textual input that includes one or more relationship parameters that serve as rules to be enforced with respect to the usage of the at least two items. In some embodiments, user input identifying a link between at least two items may comprise a selection of one or more predefined link types. For example, the user input may comprise the selection of at least one predefined link type from a selectable list of predefined link types provided via the relationship interface. Each link may be associated with one or more rules to be enforced. The one or more rules associated with each link may be unique to that link. As such, the one or more rules associated with a link may comprise constraints that are created to preserve and/or enforce the relationship defined by the link.

In various embodiments, the systems, methods, and non-transitory computer readable media are configured to enforce the rules associated with relationships between items. The rules associated with relationships—or links— between items may be enforced by surfacing violations of the rules associated with links between items, preventing one or more actions from occurring that would conflict with the rules, and/or providing error messages when a new item that conflicts with the rules is created. Violations of, or conflicts with, the one or more rules may be identified based on item information (e.g., metadata) for individual items in a system. When new rules are created, the items in the system may be analyzed to identify one or more violations and surface those violations via the relationship interface. When new items are created, the items may be analyzed against rules associated with items included in and/or associated with the new item. If the new item conflicts with one or more rules, the new item may be prevented from being committed to the system and/or an error message may be provided. Visualizations of identified violations may be provided via the relationship interface. The visualization of a violation may include a textual and/or graphical description of the violation. In some embodiments, selection of an identified violation may cause the user interface to navigate to the selected violation, or an interface through which the user may visualize and/or modify the items causing the violation.

These and other features of the systems, methods, and non-transitory computer readable media are disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention(s).

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention(s) are utilized, and the accompanying drawings of which:

DETAILED DESCRIPTION

A claimed solution rooted in computer technology overcomes problems specifically arising in the realm of computer technology. It will be appreciated by those having skill in the art that the implementations described herein may be practiced without these specific details or with an equivalent arrangement. In other instances, well-known structures and devices are shown in block diagram form to avoid unnecessarily obscuring the implementations.

Figure 1:
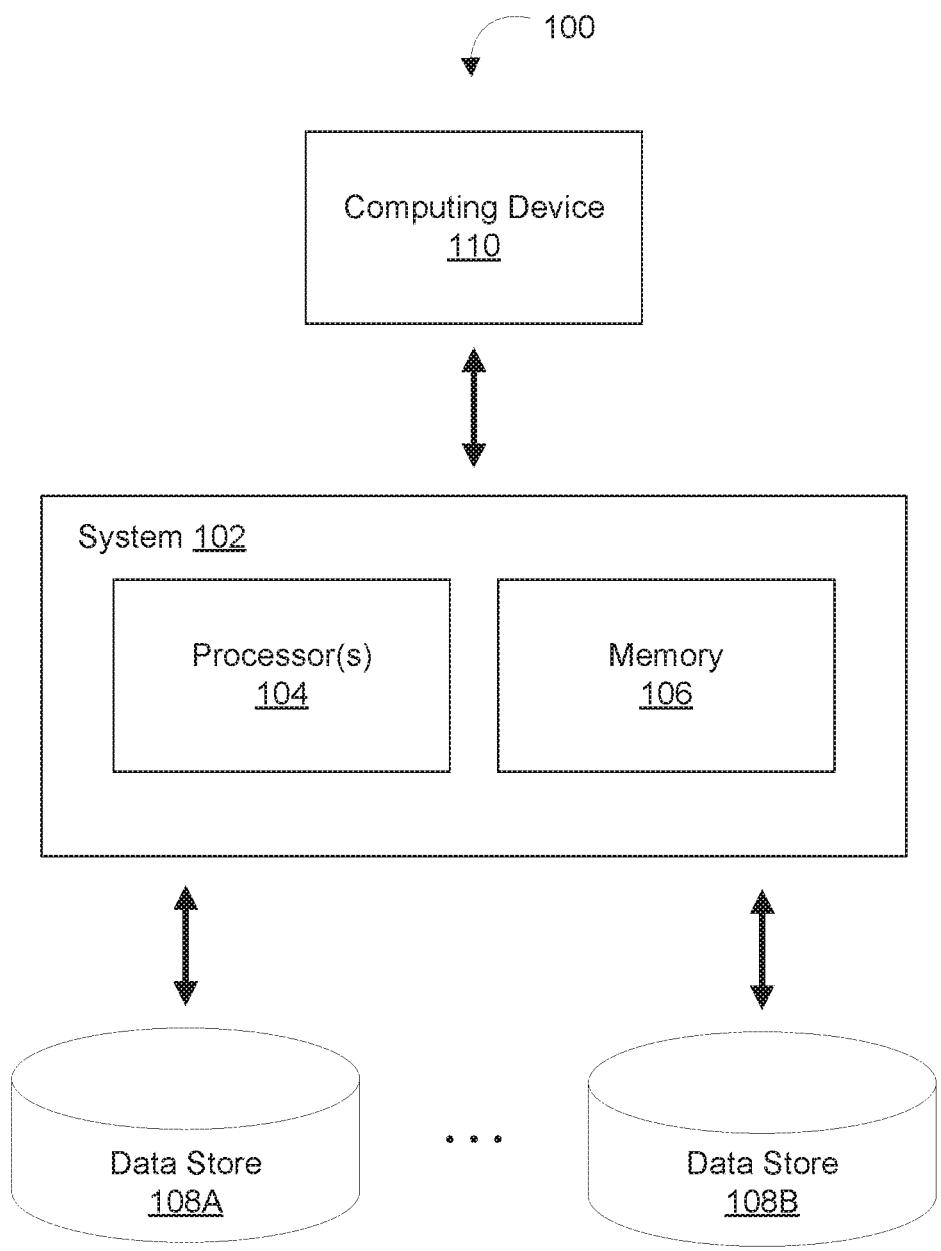
FIG. 1 depicts a diagram of an example of a system for tracking and enforcing relationships between items, in accordance with various embodiments.

FIG. 1 depicts a diagram of an example of an environment 100 for tracking and enforcing relationships between items, in accordance with various embodiments. As shown in FIG. 1, the example environment 100 can include at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. For example, memory 106 may store instructions for relationship management engine 200 that, when executed by the one or more processors 104, cause the one or more processors 104 to perform various operations described with respect to FIG. 2. The environment 100 may also include a computing device 110 that is able to communicate with the system 102 (e.g., over one or more computer networks) and a data store 108 that is accessible to the system 102.

In some embodiments, the system 102 and the computing device 110 may be integrated in a single device or system. Alternatively, the system 102 and the computing device 110 may be individual computing devices. For example, the computing device 110 may be a mobile device and the system 102 may be a computing server. The data store 108 may be accessible to the system 102, for example, through the memory 106, another device coupled to the system 102, cloud-based storage, etc. Various operations that are capable of being performed by the system 102 are described below in reference to FIGS. 2-4.

Figure 2:
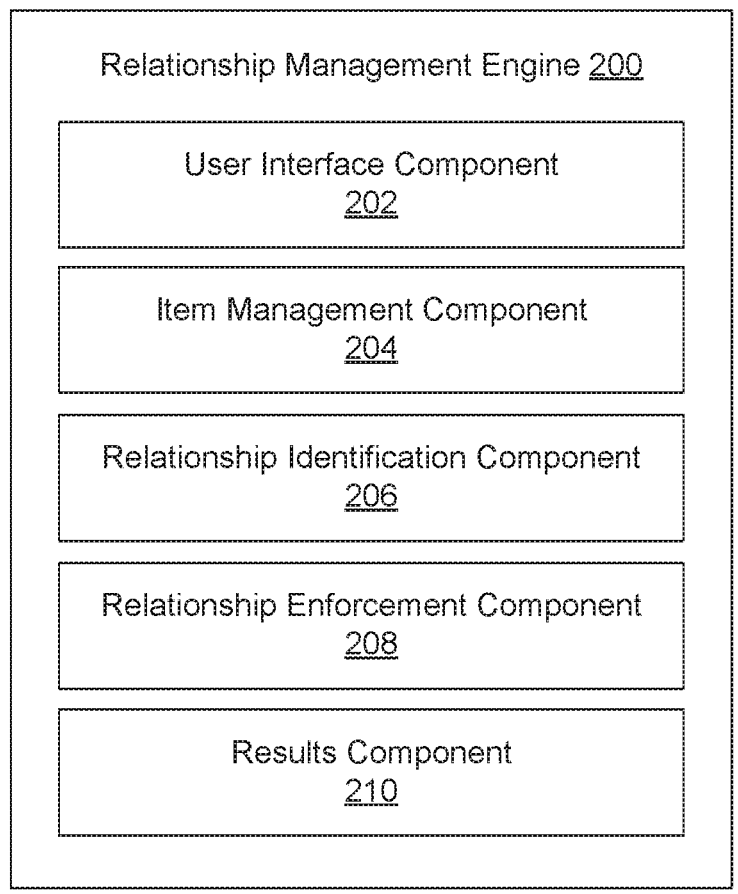
FIG. 2 depicts a diagram of an example of a relationship management engine, in accordance with various embodiments.

FIG. 2 depicts a diagram of an example of a relationship management engine 200, in accordance with various embodiments. In various embodiments, functionality of the relationship management engine 200 may be performed by one or more servers, workstations, desktop computers, laptop computers, mobile devices, and/or other computing devices. In some embodiments, functionality of the relationship management engine 200 may be performed by computing system 102. For example, the components of relationship management engine 200 may comprise computer-readable instructions executable by processors 104. The components of relationship management engine 200 may comprise user interface component 202, item management component 204, relationship identification component 206, relationship enforcement component 208, results component 210, and/or other computer program components. As used herein, for convenience, the various components of relationship management engine 200 will be described as performing an operation, when, in fact, the various components comprise instructions which may program the processors 104 (and therefore computing system 102) to perform the operation.

User interface component 202 may be configured to generate a user interface through which relationships between items may be identified, tracked, and/or enforced. In various implementations, user interface component 202 may be configured to cause the user interface to be provided to a user through a display screen of system 102 and/or computing device 110. In some implementations, the user interface may be provided by a software application running on system 102 and/or computing device 110. In some implementations, user interface component 202 may generate a user interface depicted in FIG. 3 and/or FIG. 4 and cause the user interface depicted in FIG. 3 and/or FIG. 4 to be provided to the user.

In various implementations, user interface component 202 may be configured to generate a user interface to display a set of items stored by, maintained by, and/or related to a system. In some implementations, user interface component 202 may be configured to generate a user interface to display a set of items stored by, maintained by, and/or related to system 102. The user interface may provide a visual representation of items obtained by item management component 204. For example, user interface component 202 may be configured to cause a relationship interface comprising an indication of at least a first item and a second item to be provided via a user interface. In various implementations, user interface component 202 may be configured to generate a user interface through which a visualization of relationships (or links) between items may be provided.

In various implementations, user interface component 202 may be configured to generate a user interface through which one or more users may define relationships (or links) between one or more items. For example, the user interface may be configured to receive user input identifying links between at least two items. In some implementations, user interface component 202 may be configured to generate a user interface through which one or more users may identify a link between items by selecting at least two items (or a connection between two items) and a type of link between the two items. For example, the user interface may be configured to receive user input comprising a selection of at least one type of link from a list of predefined links (e.g., from a drop-down menu), textual input identifying and/or describing the link between items, and/or one or more other forms of user input identifying a link between items. In some implementations, the identification of a link (or relationship) between items may establish one or more rules to be enforced with respect to usage of the items, as described herein with respect to relationship identification component 206.

Other user input related to the processes and results described herein may be received via a user interface generated by user interface component 202. For example, in various implementations, user input may comprise textual input provided by a user. For example, the textual input may comprise a keyword, a phrase, a date, a string of numbers, a string of letters, an alphanumeric string, and/or one or more other forms of text-based input.

In various implementations, user interface component 202 may be configured to generate a user interface through which visualizations of, and information describing, violations related to the relationships (or links) between items may be provided. For example, user interface component 202 may be configured to generate a user interface through which visualization of, and information describing violations identified by relationship enforcement component 208 may be provided.

Item management component 204 may be configured to manage and obtain (e.g., acquire, identify, retrieve) items to be presented, and/or for which one or more links are to be identified, via a user interface. An item may comprise and/or represent one or more datasets (e.g., raw upload datasets, ingests from other systems, datasets derived from raw uploads, analyzed datasets, and/or other datasets), artifacts of datasets, data catalogs, data paths, spreadsheets, time-series, ontology objects, reports, use cases, projects, systems, folders, applications, data sources and/or other resources, and/or other types of data objects or tools. In some implementations, an item may comprise, or serve as a representative placeholder for, an individual user, a set of users, a predefined group of users, one or more users having particular characteristics, and/or one or more other individuals or groups of individuals. For example, one item may comprise a data object representing administrative users of a system (i.e., system 102) and another item may comprise a data object representing end users of the system. Each item managed and obtained by item management component 204 may be related to, maintained by, stored in, and/or have a relationship with system 102 and/or one or more other items of system 102. In various implementations, item management component 204 may be configured to obtain one or more items to be presented via a relationship interface.

Figure 3:
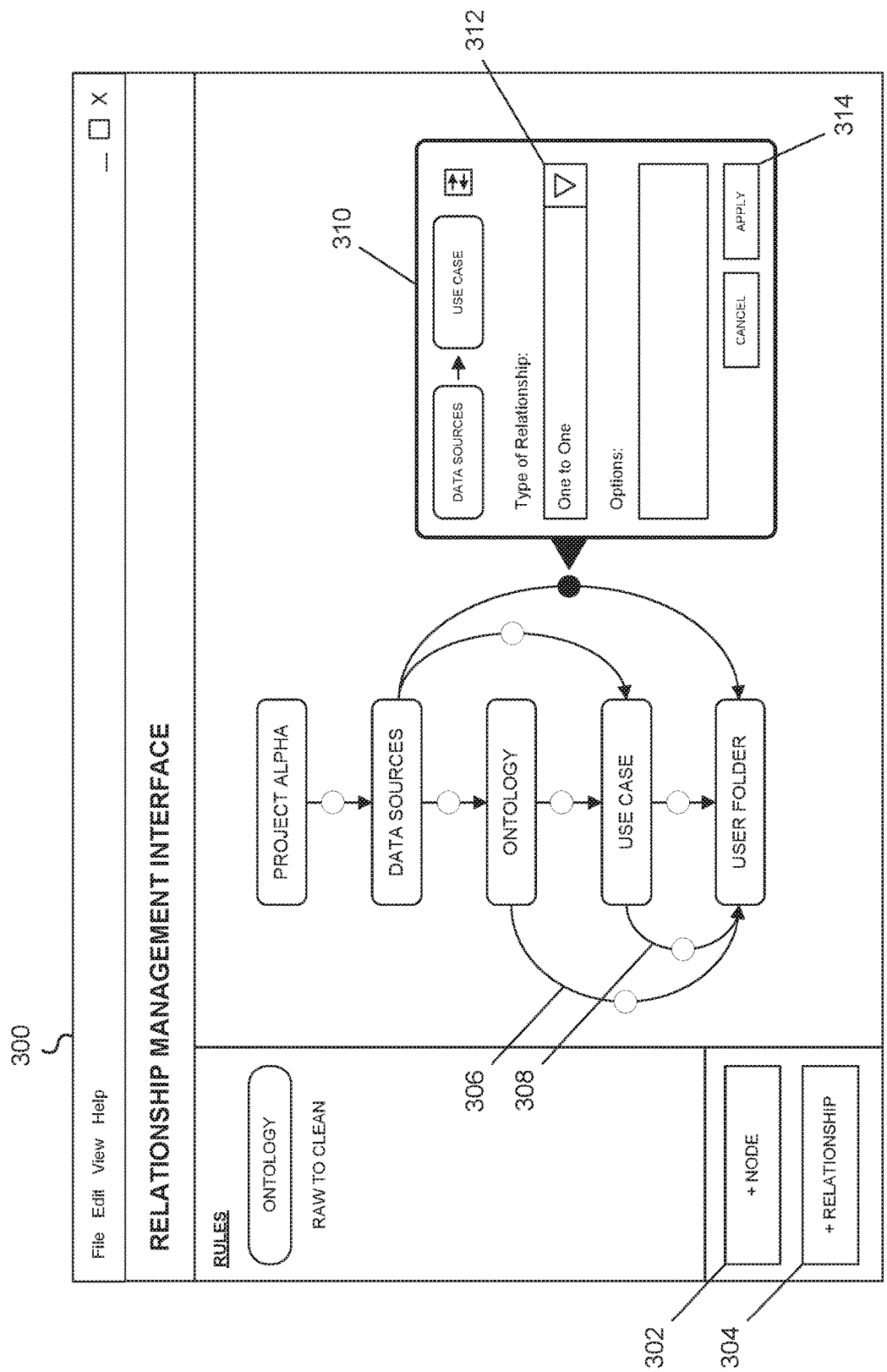
FIG. 3 depicts an example interface presented to a user through which relationships between items of a system may be defined and/or depicted, in accordance with various embodiments.

For example, FIG. 3 depicts an example interface 300 of a relationship interface, in accordance with various embodiments. Example interface 300 may include an interface through which relationships between items of a system may be defined and/or depicted. Example interface 300 may comprise a node addition component 302, a relationship addition component 304, a first link 306, a second link 308, a link identification window 310, a link type identification component 312, and/or one or more other components. In various implementations, a relationship interface may include a depiction of one or more items. Each depiction of one or more items may comprise a node. For example, the items depicted in example interface 300 may be represented by nodes comprising PROJECT ALPHA, DATA SOURCES, ONTOLOGY, USE CASE, and USER FOLDER. Each of the items depicted in example interface 300 may be related to each of the other items depicted in example interface 300. For example, the node DATA SOURCES may represent each of the data sources for the project represented by the node PROJECT ALPHA. Components of FIG. 3 are described further herein.

In various implementations, item management component 204 may be configured to obtain various types of data related to one or more items. For example, data obtained related to one or more items may comprise item information. In various implementations, item management component 204 may be configured to manage and/or obtain item information. Item information for an item may comprise metadata associated with that item. In various implementations, metadata for an item may comprise information related to the item. For example, the information related to the item may include indications of relationships between the item and one or more other items. For example, the information may include indications of relationships between items based on one or more dependencies between the items (or dependencies between fields within the items), associations between items (e.g., one or more items are stored in association with or as a component of one or more other items), and/or other connections between the items.

In various implementations, item management component 204 may be configured to cause items obtained to be provided to one or more other components of relationship management engine 200. In some implementations, item management component 204 may be configured to prepare obtained data for use by one or more other components of relationship management engine 200.

In various implementations, item management component 204 may be configured to obtain items to be presented based on user input. For example, item management component 204 may be configured to obtain items to be presented via a relationship interface based on user input received via the relationship interface. In various implementations, user input identifying one or more items (e.g., a set of items) may be received via the user interface via which the relationship interface is provided. The user input may comprise textual input identifying one or more items, a selection of one or more items, and/or other input identifying one or more items to be presented via the relationship interface. For example, user input comprising a selection of one or more items may comprise a selection of a system or project. Based on the selected system or project, item management component 204 may be configured to obtain one or more items associated with the selected system or project. In some implementations, user interface component 202 may be configured to generate and provide an interface comprising a selectable list of one or more items and/or an input component configured to receive textual input identifying one or more items to be presented. For example, the input component may comprise a search bar via which a user may provide textual input indicating one or more items to search for. In some implementations, item management component 204 may be configured to identify one or more items to be presented via the relationship interface based on user input received and obtain one or more identified items. The items obtained may be presented via a relationship interface as one or more nodes.

For example, and referring back to FIG. 3, example interface component 300 may include node addition component 302. Node addition component 302 may comprise a selectable component that causes a selectable list of one or more items to be presented and/or an input component configured to receive textual input identifying one or more items to be presented. A single node may comprise the depiction of one or more items in the relationship interface. For example, the node PROJECT ALPHA may comprise a depiction of all of the items associated with the project represented by the node.

In various implementations, item management component 204 may be configured to update one or more items and/or item information for one or more items. In some implementations, item management component 204 may be configured update item information for an item based on links identified between the item and one or more other items. For example, item management component 204 may be configured to update the item information for an item based on a link identified via relationship identification component 204 between that item and one or more other items. In some implementations, updating item information for an item based on a link identified between that item and one or more other items may include associating one or more rules related to the identified link with the item. For example, updating item information for an item based on a link identified between that item and one or more other items may include updating the item information to include one or more rules to be enforced with respect to the usage of that item based on the identified link.

In some implementations, item management component 204 may be configured to automatically obtain items to be presented to a user via a user interface (i.e., via the relationship interface) based on the identification of the user. In some implementations, system 102 may identify a user accessing the relationship interface. For example, a user may provide identification information to access the relationship interface and/or access the relationship interface via a device associated with the user. Based on the identification of the user, item management component 204 may be configured to identify items associated with the user and cause the items associated with the user to be presented to the user via the user interface. In some implementations, an individual user may be associated with one or more systems, projects, and/or use cases. For example, each individual user may be assigned to, responsible for, have access to, and/or otherwise be associated with one or more systems, projects, and/or use cases. Based on the systems, projects, and/or use cases associated with the user, item management component 204 may be configured to automatically obtain and/or provide one or more items related to the systems, projects, and/or use cases associated with the user. In some implementations, item management component 204 may be configured to automatically cause items associated with a user (i.e., indications of items associated with a user) to be provided via a user interface when a user accesses a relationship interface without further input from the user. In other words, the relationship interface may automatically populate items associated with a given user when that user accesses the relationship interface.

For example, and referring back to FIG. 3, item management component 204 may be configured to automatically obtain items associated with a user when that user accesses example interface 300 and cause the obtained items to be presented via example interface component 300 as the nodes depicted in example interface 300. In the embodiment depicted by FIG. 3, the user accessing example interface 300 may be associated with a project titled "Project Alpha." Based on the identification of the user, item management component 204 may be configured to automatically obtain the one or more items associated with Project Alpha and cause the obtained items to be presented via example interface 300 as the nodes depicted therein.

Relationship identification component 206 may be configured to enable a user to define one or more relationships between items in a system. For example, relationship identification component 206 may be configured to facilitate the identification of links between items in a system. A link between items may define the relationship between the items. The identification of links between items may establish one or more rules to be enforced with respect to usage of the items. Based on the links identified between one or more of a set of items, a user may utilize the relationship interface to visualize how items within a system are interrelated.

Referring back to FIG. 3, example interface 300 may include an interface through which relationships between items of a system may be identified and/or depicted. For example, as described herein, the items depicted in example interface 300 may be represented by nodes comprising PROJECT ALPHA, DATA SOURCES, ONTOLOGY, USE CASE, and USER FOLDER. In various implementations, one or more relationships between items may be known by the system. For example, each of the items depicted in example interface 300 may be related to each of the other items depicted in example interface 300.

In various implementations, relationship identification component 206 may be configured to automatically identify relationships between multiple items based on item information for one or more of the multiple items. For example, based on item information for at least one of two items, relationship identification component 206 may be configured to identify a relationship between the two items. In the example implementation depicted in FIG. 3, relationship identification component 206 may be configured to determine, based on item information for one or more data sources, that the one or more data sources comprise data generated based on a project titled "Project Alpha." As such, the one or more data sources are associated with Project Alpha. Based on the foregoing determination, relationship identification component 206 may be configured to automatically determine that a relationship exists between the one or more data sources and Project Alpha. Accordingly, in example interface 300, a relationship between the one or more data sources and Project Alpha may be depicted by the link between the node PROJECT ALPHA and the node DATA SOURCES.

In various implementations, the relationship interface may be configured to present one or more known and/or previously defined relationships between items. For example, the relationship interface may be configured to provide a visualization of links between items that are automatically identified by relationship identification component 206 (e.g., based on item information) and/or identified via user input received via the relationship interface. In various implementations, the relationship interface may provide a visualization of items in a system that includes an indication of the relationships between the items. For example, and referring back to FIG. 3, example interface 300 may include a first link 306, a second link 308, and/or one or more other links that indicate relationships between items presented via example interface 300. In the example implementation depicted by FIG. 3, first link 306 may depict a relationship between the items ONTOLOGY and USER FOLDER, and second link 308 may depict a relationship between the items USE CASE and USER FOLDER. As described herein, item management component 204 may be configured to update item information based on links identified between items. First link 306 and second link 308 may comprise links previously identified by a user via user input received through the relationship interface.

In various implementations, relationship identification component 206 may be configured to receive user input identifying links between items. For example, relationship identification component 206 may be configured to receive user input identifying a between a first item and a second item. In various implementations, the identification of a link between items may establish one or more rules to be enforced with respect to usage of those items. For example, one or more rules to be enforced with respect to the usage of at least two items may define a policy governing the use of those items. The one or more rules may serve to preserve the provenance or relationship between the items. For example, establishment of the one or more rules may cause relationship enforcement component 208 to identify one or more violations of the one or more rules, prevent one or more actions from occurring, apply constraints to the use of the items to which the rules are applied, and/or otherwise enforce the one or more rules. In various implementations, relationship identification component 206 may be configured to enable a user to define the relationship between items in a system by selecting one or more predefined link types, providing one or more relationship parameters, and/or otherwise defining the relationship between the items and specifying rules to be enforced with respect to the usage of those items based on the relationship between the items.

In various implementations, relationship identification component 206 may be configured to facilitate the identification of links between items depicted in a relationship interface via a link identification window. For example, and referring to FIG. 3, example interface 300 may include a link identification window 310 and/or one or more other components. In various implementations, a user may identify a relationship between at least two items by selecting the at least two items for which to define the relationship and define the relationship between the at least two items by identifying a link between the two items. For example, a user interface may be configured to receive an identification of at least two items by receiving a user selection of the at least two items. In some implementations, user selection of an item may comprise user input comprising the selection of a node depicting an item in the relationship interface. In some implementations, each node may comprise a selectable component through which a user may select the item in order to identify a link between that item and at least one other item.

Referring back to FIG. 3, once two or more items are selected and a link between them is created, the link may be identified via link identification window 310. In an example implementation, a link between the nodes DATA SOURCES and USER FOLDER may be created. For example, the link between the nodes DATA SOURCES and USER FOLDER may be created by selecting the nodes DATA SOURCES and USER FOLDER and/or by drawing a line between the nodes DATA SOURCES and USER FOLDER. In various implementations, a user may define the relationship between one or more data sources represented by the node DATA SOURCES and a user folder represented by the node USER FOLDER by identifying a link between the nodes via link identification window 310. For example, once a link between two items is created, a user may select the line representing the link (i.e., the selected line depicted in example interface 300). Responsive to receipt of a user selection of the link between two nodes, relationship identification component 206 may be configured to cause link identification window 310 to be provided via the user interface (i.e., the relationship interface) generated by user interface component 202.

In various implementations, a link between items may be identified based on the selection of at least one of a set of predefined link types. For example, relationship identification component 206 may be configured to identify a link between two items based on the receipt of user input comprising a selection of one or more predefined link types. The one or more predefined link types may relate to types of relationships that exist between items in system 102, and/or one or more other systems. For example, the selection of a predefined link type for a first item and a second item may indicate that: the first item is a parent or child of the second item; a one-to-one relationship exists between the first item and the second item; the first item is a subset of the second item; the first item has to come before or after the second item; no union of data may exist between the first item and the second item; the first item must include the second item; the first item may or may not access the second item; and/or one or more other types of relationships that may be contemplated between items in a system. In various implementations, the one or more predefined link types may be created and/or established by one or more administrative users of system 102.

In various implementations, relationship identification component 206 may be configured to cause a selectable list of predefined link types to be provided via the user interface. For example, and referring to FIG. 3, link identification window 310 of example interface 300 may include at least a link type identification component 312. In some implementations, a selectable list of predefined link types may be provided via link type identification component 312. In various implementations, relationship identification component 206 may be configured to receive a selection of at least one of the predefined link types. For example, relationship identification component 206 may be configured to receive a selection of at least one of one or more predefined link types via a selectable list of predefined link types. Responsive to the selection of at least one of the predefined link types, relationship identification component 206 may be configured to identify the link between at least two items based on the selected one or more predefined link types. For example, responsive to the selection of the "One to One" predefined link type via link type identification component 312, relationship identification component 206 may be configured to establish a one-to-one link between the one or more data sources represented by the DATA SOURCES node and the user folder represented by the USER FOLDER node, as depicted in example interface 300 of FIG. 3.

Each predefined link type may be associated with one or more predefined rules to be enforced. In various implementations, one or more predefined rules associated with a predefined link type may be created and/or established by one or more administrative users of system 102. In various implementations, one or more predefined rules associated with a predefined link type may be stored in association with the predefined link type in a data store of system 102 (e.g., data store 108). One or more predefined rules associated with each predefined link type may be unique to that link type. As such, in some implementations, one or more predefined rules associated with a predefined link type may comprise constraints that are created to preserve and/or enforce the relationship defined by the predefined link type. In various implementations, based on the selection of the "One to One" predefined link type for the link between the DATA SOURCES node and the USER FOLDER node, relationship identification component 206 may be configured to associate one or more predefined rules associated with one-to-one links with the one or more data sources represented by the DATA SOURCES node and the user folder represented by the USER FOLDER node. Accordingly, the one or more predefined rules associated with the one-to-one link type may be enforced with respect to the use of the one or more data sources and/or the user folder based on the establishment of the one-to-one link between the items In various implementations, relationship identification component 206 may be configured to define a link between two items based on the receipt of user input comprising one or more relationship parameters. For example, the relationship interface may be configured to receive textual input related to a link between at least two items that defines one or more relationship parameters to associate with a link between at least two items. The one or more relationship parameters may comprise one or more constraints to apply to the use of the at least two items. Responsive to the receipt of the textual input defining one or more relationship parameters to associate with a link between at least two items, relationship identification component 206 may be configured to establish the link between the at least two items and associate the link between the at least two items with the receive relationship parameters, such that the relationship parameters comprise one or more rules to be enforced with respect to the use of the items.

In various implementations, relationship identification component 206 may be configured to identify a link between a first item and a second item that indicates that the first item is a parent of the second item or that the first item is a child item of the second item. In an example implementation, a parent-child relationship may be established between at least two items. For example, a raw upload received may be a parent of one or more analyzed datasets that are generated based on the raw upload. Accordingly, each of the one or more analyzed datasets may comprise a child of the raw upload. In some implementations, a first item that references information from a second item may comprise a child of the second item. For example, an item comprising a document management database that references authors of the individual documents by author ID rather than author name may link to author item comprising an author database that includes information on authors, including the author ID. Thus, in order to modify an author in the document manage database, only the author database needs to be modified. Accordingly, the document management database may be a child of the author database, and the author database may be a parent of the document management database. In the foregoing example implementation, relationship identification component 206 may be configured to define the parent-child relationship between the author database and the document management database by establishing a parent-child link between the two items. For example, relationship identification component 206 may be configured to identify a link between a first item and a second item that indicates that the first item is a parent of the second item based on item information for the first item and/or the second item and/or based on the user identification of a parent-child link between the first item and the second item. As described herein, a user may define a link between two items by selecting of one or more predefined link types, providing one or more relationship parameters, and/or otherwise defining the relationship between the two items by identifying a link between the items.

In various implementations, relationship identification component 206 may be configured to establish one or more rules to be enforced with respect to usage of at least two items based on the identification of a parent-child relationship between the two items. For example, selection of a predefined link type associated with a parent-child relationship for two items may cause one or more predefined rules associated with the parent-child predefined link type to be associated with the two items. In some implementations, the one or more rules established based on the identification of a parent-child relationship between two items may include constraints that dictate that modifications in a parent item must be reflected in the child item, information included in the parent item may not be modified via the child, and/or one or more other rules to be enforced to maintain the parent-child relationship between the two items. In the example implementation involving raw uploads and analyzed datasets, the one or more rules established based on the identification of a parent-child relationship between the raw uploads and the analyzed datasets may include constraints that require everything in the analyzed dataset item to have a parent in a raw uploads item and no where else, prohibit/restrict raw uploads item itself from having parent(s) in analyzed dataset items, and/or one or more other rules to ensure data only flows in one direction—from parent to child.

In various implementations, relationship identification component 206 may be configured to identify a link between a first item and a second item that indicates that a one-to-one relationship exists between the first item and the second item. A one-to-one relationship exists between two items when an aspect of one item may only be linked with an aspect of another item. For example, in two datasets, a one-to-one relationship may exist when one row in the first dataset may only be linked with one row in the second dataset. In some implementations, relationship identification component 206 may be configured to identify a link between a first item and a second item that defines a one-to-one relationship between the first item (or an aspect of the first item) and the second item (or an aspect of the second item). In various implementations, relationship identification component 206 may be configured to establish one or more rules to be enforced with respect to usage of the at least two items based on the identification of a one-to-one relationship between the two items. For example, selection of a predefined link type associated with a one-to-one relationship for the two items may cause one or more predefined rules associated with the one-to-one predefined link type to be associated with the two items. In some implementations, the one or more rules established based on the identification of a one-to-one relationship between two items may include constraints that prohibit/restrict the two items (or at least the linked aspects of the two items) from being linked with any other items. As such, the one or more rules may be enforced to ensure the one-to-one relationship between the items is preserved.

In some implementations, relationship identification component 206 may be configured to identify a link between a first item and a second item that indicates that the first item is a subset of the second item. For example, a first item that is a subset of a second item may include only that which is also included in the second item. Accordingly, all of the first item must also be included in the second item. In some implementations, relationship identification component 206 may be configured to identify a link between a first item and a second item that indicates that the first item is a subset of the second item. In various implementations, relationship identification component 206 may be configured to establish one or more rules to be enforced with respect to usage of the at least two items based on the identification of one item as a subset of the other item. For example, selection of a predefined link type indicating that a first item is a subset of a second item may cause one or more predefined rules associated with the predefined link type to be associated with the two items. In some implementations, the one or more rules established based on the identification of a first item as a subset of a second item may include constraints that require the first item to include only information, data, or other items that are included within the second item and/or require that the second item include all that is within the first item. Enforcement of the one or more rules may ensure the subset-relationship between the two items is preserved.

In some implementations, relationship identification component 206 may be configured to identify a link between a first item and a second item that indicates that the first item must come after the second item. In some implementations, the one or more rules associated with a link that indicates that a first item must come after a second item require that the first item come after the second item (e.g., in a process flow for using/analyzing items).

In some implementations, relationship identification component 206 may be configured to identify a link between a first item and a second item that indicates that no union of data may exist between the first item and the second item. In some implementations, the one or more rules associated with a link that indicates that no union of data may exist between the first item and the second item may prohibit/restrict the union of data between the first item and the second item.

In some implementations, relationship identification component 206 may be configured to identify a link between a first item and a second item that restricts or grants access by the first item to the second item. For example, as previously described, an item may comprise, or serve as a representative placeholder for, an individual user, a set of users, a predefined group of users, one or more users having particular characteristics, and/or one or more other individuals or groups of individuals. Via the relationship interface, a user may establish access controls for one or more users by identifying a link between an item comprising one or more users and an item to which access by the one or more users is to be controlled. For example, a first item may comprise a specific group of employees. A second item may comprise a project for which the specific group of employees are restricted from accessing. Via the relationship interface, a relationship may be defined that restricts the specific group of employees from accessing the project (and one or more items associated with the project) by identifying a link between a first item representing the specific group of employees and a second item representing the project for which they are prevented from accessing. The one or more rules associated with the link may restrict access to the project by the specific group of users by modifying individual access controls of the employees stored in employee profiles, application profiles, and/or security protocols, and/or by modifying access controls stored elsewhere in the system related to the identified project.

In some implementations, relationship identification component 206 may be configured to identify a link between a first item and a second item that indicates that each item associated with a first item must contain a second item. For example, a second item may comprise a disclaimer associated with a given assignment or project. Via the relationship interface, a relationship between a first item comprising an assignment or project (which includes each of one or more items related to that assignment or project) and a second item comprising a prepared disclaimer may be defined by establishing a link between the first item and the second item that is associated with one or more rules that require the second item (the disclaimer) to appear in each of the one or more items within, or associated with, the first item.

One or more other relationships between items in a system may be identified as contemplated by users of the systems and methods described herein.

In various implementations, relationship identification component 206 may be configured to cause indications of links between items to be stored in association with the one or more items. For example, indications of links between items and the one or more rules associated with the identified links may be stored in item information for the one or more items. As previously described herein, item management component 204 may be configured to update item information for individual items based on links identified between the individual items and one or more other items. In various implementations, relationship identification component 206 may be configured to cause the identified links between items, and the rules associated with the identified links, to be provided to relationship enforcement component 208.

Relationship enforcement component 208 may be configured to enforce the rules associated with relationships between items. For example, relationship enforcement component 208 may be configured to preserve or enforce a relationship between two or more items by enforcing the rules associated with a link between the two or more items. In some implementations, relationship enforcement component 208 may be configured to surface violations of the rules associated with links between items, prevent one or more actions from occurring that would conflict with the rules, and/or otherwise enforce the relationships between items by enforcing the rules associated with the links between the items. In some implementations, relationship enforcement component 208 may be configured to identify violations of rules associated with links between items and cause indications of the identified violations to be provided via a user interface. In an example implementation, relationship enforcement component 208 may be configured to identify violations of rules associated with links between items and cause indications of the identified violations to be provided via the relationship interface described herein.

In various implementations, relationship enforcement component 208 may be configured to identify one or more violations of rules to be enforced with respect to the usage of items. For example, responsive to the establishment of a link between at least two items, relationship enforcement component 208 may be configured to identify one or more violations of the rules associated with the identified link. In an example implementation in which a link is established between a first item comprising raw uploads and a second item comprising an analyzed dataset that indicates that the first item is a parent of the second item, relationship enforcement component 208 may be configured to identify one or more violations of the rules associated with the identified link. For example, relationship enforcement component 208 may be configured to identify one or more instances in which information in the analyzed dataset is derived from one or more items that do not comprise raw uploads and/or instances in which one or more other items have a parent-child relationship with the raw uploads, wherein the raw uploads are the child. In an example implementation in which a link is established that indicates that a first item is a subset of a second item, relationship enforcement component 208 may be configured to identify one or more instances in which information included in the first item is not included in the second item. In the foregoing example implementation, each instance in which information included in the first item is not included in the second item comprises a violation of the one or more rules associated with the first item and the second item. In an example implementation in which a link is established between a first item and a second item that indicates a one-to-one relationship between the first item (or an aspect of the first item) and the second item (or an aspect of the second item), relationship enforcement component 208 may be configured to identify one or more instances in which the aspects of the first item and the second item that are linked are also linked with one or more other items.

In various implementations, relationship enforcement component 208 may be configured to identify violations of one or more rules associated with links between items based on item information for items. For example, relationship enforcement component 208 may be configured to crawl a system for potential violations of the one or more rules. In various implementations, relationship enforcement component 208 may be configured to analyze metadata for one or more items and identify violations of the one or more rules based on the analysis of the metadata.

In various implementations, relationship enforcement component 208 may be configured to prevent one or more actions from occurring that would result in conflicts with one or more rules associated with links established via relationship identification component 206. For example, when new items are created, relationship enforcement component 206 may be configured to verify the new items do not violate one or more rules associated with links between existing items. For example, a new item may comprise a new data object that utilizes a first item and a second item. In various implementations, relationship enforcement component 208 may be configured to analyze the new data object to determine whether the new item violates one or more rules. For example, relationship enforcement component 208 may be configured to determine whether the new item violates one or more rules associated with at least one link involving the first item and/or the second item. Responsive to a determination that the new item violates at least one rule associated with a link involving the first item and/or the second item, relationship enforcement component 208 may be configured to prevent the new item from being committed to the system. For example, relationship enforcement component 208 may be configured to generate instructions that, when provided by relationship enforcement component 208, cause the system to prevent the new item from being committed to the system. In some implementations, relationship enforcement component 208 may be configured to cause an error message to be provided responsive to a determination that a new item violates one or more rules associated with links between items in the system. For example, relationship enforcement component 208 may be configured to cause an error message to be provided via a user interface generated by user interface component 202 responsive to a determination that a new item violates one or more rules associated with links between items in the system.

Results component 210 may be configured to cause visualizations of links between items and/or violations of rules associated with the links between items to be provided via a user interface. The visualizations may enable a user to gain a deeper insight into the interrelationships between the items in a system and more readily identify instances in which potential conflicts may exist. Furthermore, the interface may enable a user to manually create enforceable relationships and view the ways in which those relationships are being followed, or not followed, within a system.

In various implementations, results component 210 may be configured to cause visualizations of links between items established via relationship identification component 206 to be provided via a relationship interface. In some implementations, results component 210 may be configured to cause visualizations of links between items established via relationship identification component 206 to be provided via a relationship interface generated by user interface component 202. For example, and referring back to FIG. 3, example interface 300 may include an interface through which relationships between items of a system may be defined and/or depicted.

Figure 4:
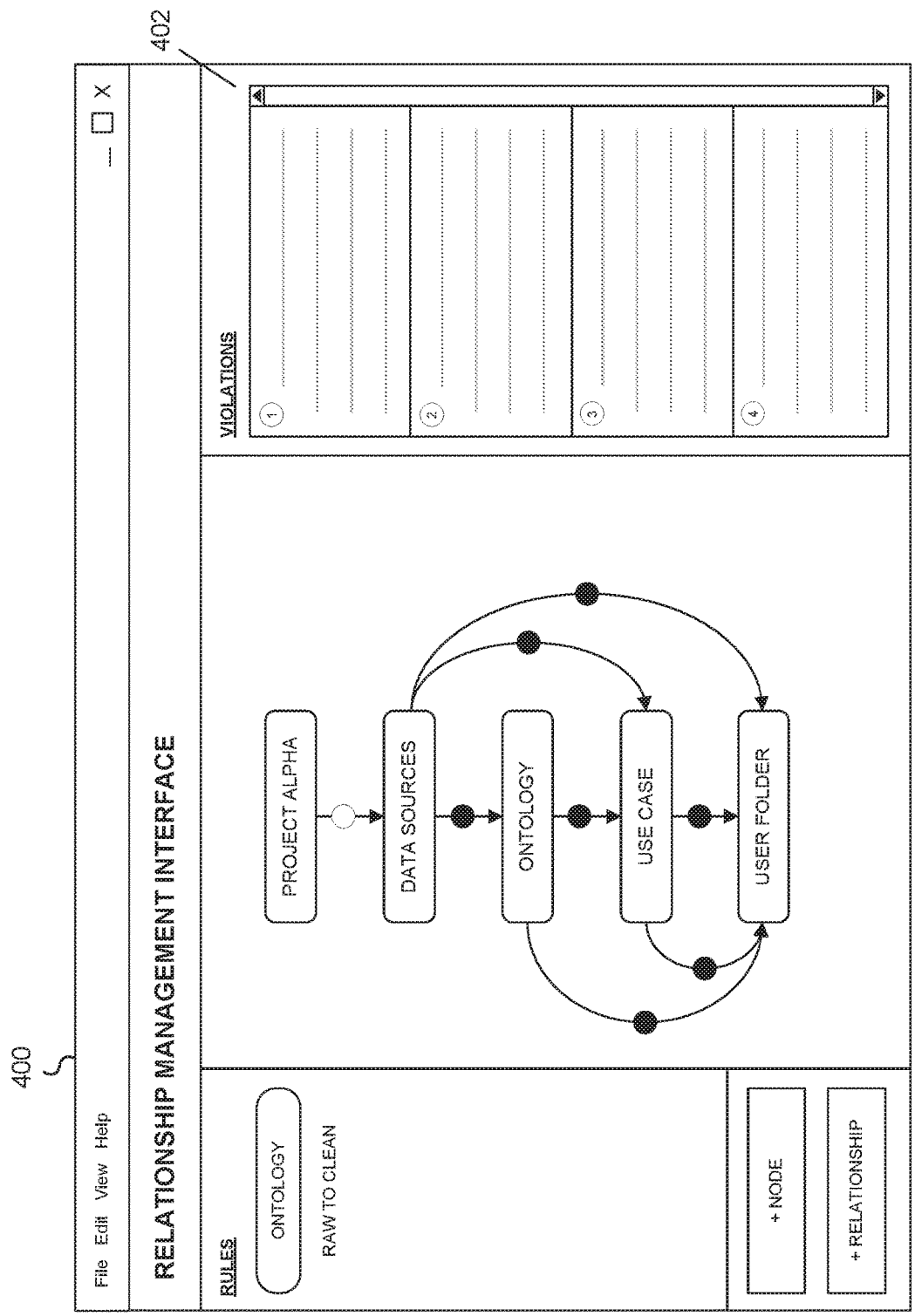
FIG. 4 depicts an example interface presented to a user through which relationships between items of a system may be enforced, in accordance with various embodiments.

In various implementations, results component 210 may be configured to cause visualizations of violations of rules associated with links between items identified via relationship enforcement component 208 to be provided via a relationship interface. In some implementations, results component 210 may be configured to cause visualizations of violations of rules associated with links between items identified via relationship enforcement component 208 to be provided via a relationship interface generated by user interface component 202. For example, FIG. 4 depicts an example interface 400 of a relationship interface, in accordance with various embodiments. Example interface 400 may include an interface through which relationships between items of a system may be enforced. Example interface 400 may comprise a violation identification component 402 and/or one or more other components. Via the relationship interface, relationships between items in a system may be defined and/or depicted. For example, relationships between items may be defined by identifying links between the items. Each link between items may be associated with one or more rules to be enforced with respect to the usage of the items. In various implementations, identified violations of the one or more rules may be provided via violation identification component 402 of example interface 400. In some implementations, identified violations provided via a user interface may be selectable. Responsive to the receipt of a selection of a violation provided via a user interface, results component 210 may be configured to cause additional information related to the violation to be provided via the user interface. In some implementations, selecting a violation provided via a user interface may cause the user interface to navigate to the item(s) causing the violation.

Accordingly, results component 210 may be configured to provide instructions to user interface component 202 that cause the user interface to navigate from the relationship interface (e.g., example interface 400) to an interface through which one or more items causing a violation may be visualized and/or modified.

In some implementations, results component 210 may be configured to cause one or more visualizations of violations identified to be provided via a user interface. For example, results component 210 may be configured to cause a textual description of an identified violation to be provided. In some implementations, results component 210 may be configured to cause a graphical description of an identified violation to be provided. For example, results component 210 may be configured to provide an indication that a first item is a child of a second item responsive to a determination that one or more rules indicate that the first item is a parent of the second item. Accordingly, the relationship interface may be configured to facilitate the visualization of items in a system, the visualization of relationships between the items in the system, the manual establishment of new links between the items in the system, the identification of violations of rules associated with the relationships/links between items in the system, and/or the graphical visualization of the identified violations of rules associated with the relationships/links between the items in the system.

Example Flowcharts of Process

Figure 5:
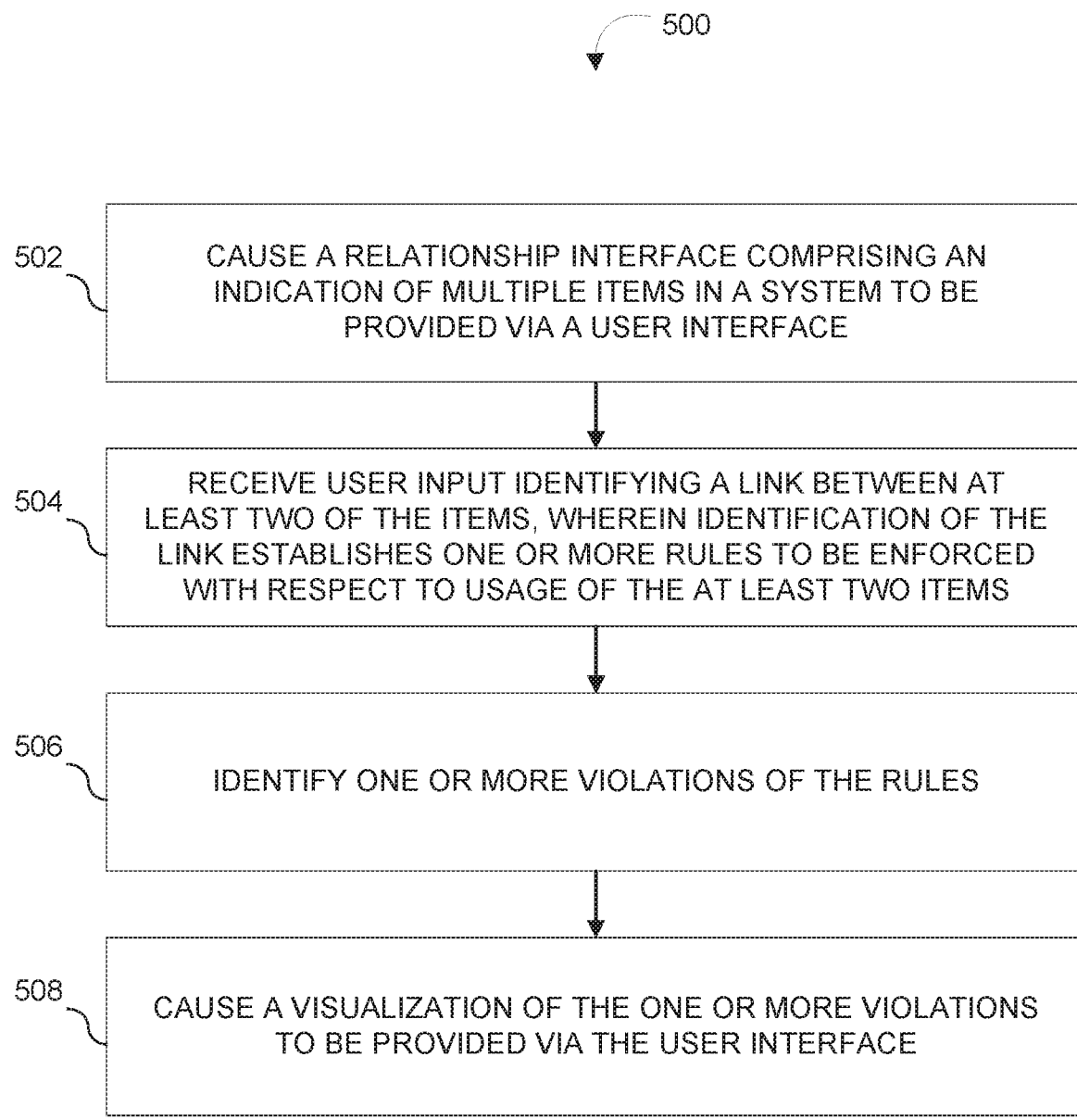
FIG. 5 depicts a flowchart of an example method for tracking and enforcing relationships between items, in accordance with various embodiments

FIG. 5 depicts a flowchart of an example method 500 for tracking and enforcing relationships between items, in accordance with various embodiments. The operations of method 500 presented below are intended to be illustrative and, as such, should not be viewed as limiting. In some implementations, method 500 may be accomplished with one or more additional operations not described, and/or without one or more of the operations discussed. In some implementations, two or more of the operations may occur substantially simultaneously. The described operations may be accomplished using some or all of the system components described herein.

In an operation 502, method 500 may include causing a relationship interface to be provided via a user interface. The relationship interface may comprise indication(s) of multiple items in a system. Via the relationship interface, relationships between items may be identified, tracked, and/or enforced. In various implementations, user input may be received via the relationship interface identifying links between at least two items. In some implementations, operation 502 may be performed by a component the same as or similar to user interface component 202 (shown in FIG. 2 and described herein).

In an operation 504, method 500 may include receiving user input identifying a link between at least two items presented via the relationship interface. In some implementations, a link between at least two items may be identified based on user input comprising a selection of at least one type of link from a list of predefined links, textual input identifying and/or describing the link between items, and/or one or more other forms of user input identifying a link between items. In various implementations, identifying a link between at least two items establishes one or more rules to be enforced with respect to the usage of at least those items. In some implementations, operation 504 may be performed by a component the same as or similar to user interface component 202 and relationship identification component 206 (shown in FIG. 2 and described herein).

In an operation 506, method 500 may include identifying one or more violations of the rules associated with identified links. In some implementations, identifying a violation of a rule may include identifying one or more items causing the violation. Indications of identified violations may be provided via a user interface. In various implementations, violations of the rules associated with identified links may be identified based on item information for individual items within the system. For example, metadata for items within a system may be analyzed and violations of one or more rules may be identified based on the analysis. In some implementations, operation 506 may be performed by a component the same as or similar to relationship enforcement component 208 (shown in FIG. 2 and described herein).

In an operation 508, method 500 may include causing a visualization of the one or more violations to be provided via a user interface. In some implementations, the visualization of the one or more identified violations may include a textual and/or graphical description of the one or more identified violations. In some implementations, receiving user input comprising a selection of an identified violation may cause the user interface to navigate to the selected violation, or an interface through which the user may visualize and/or modify the items causing the violation. In some implementations, operation 508 may be performed by a component the same as or similar to user interface component 202 and results component 210 (shown in FIG. 2 and described herein).

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
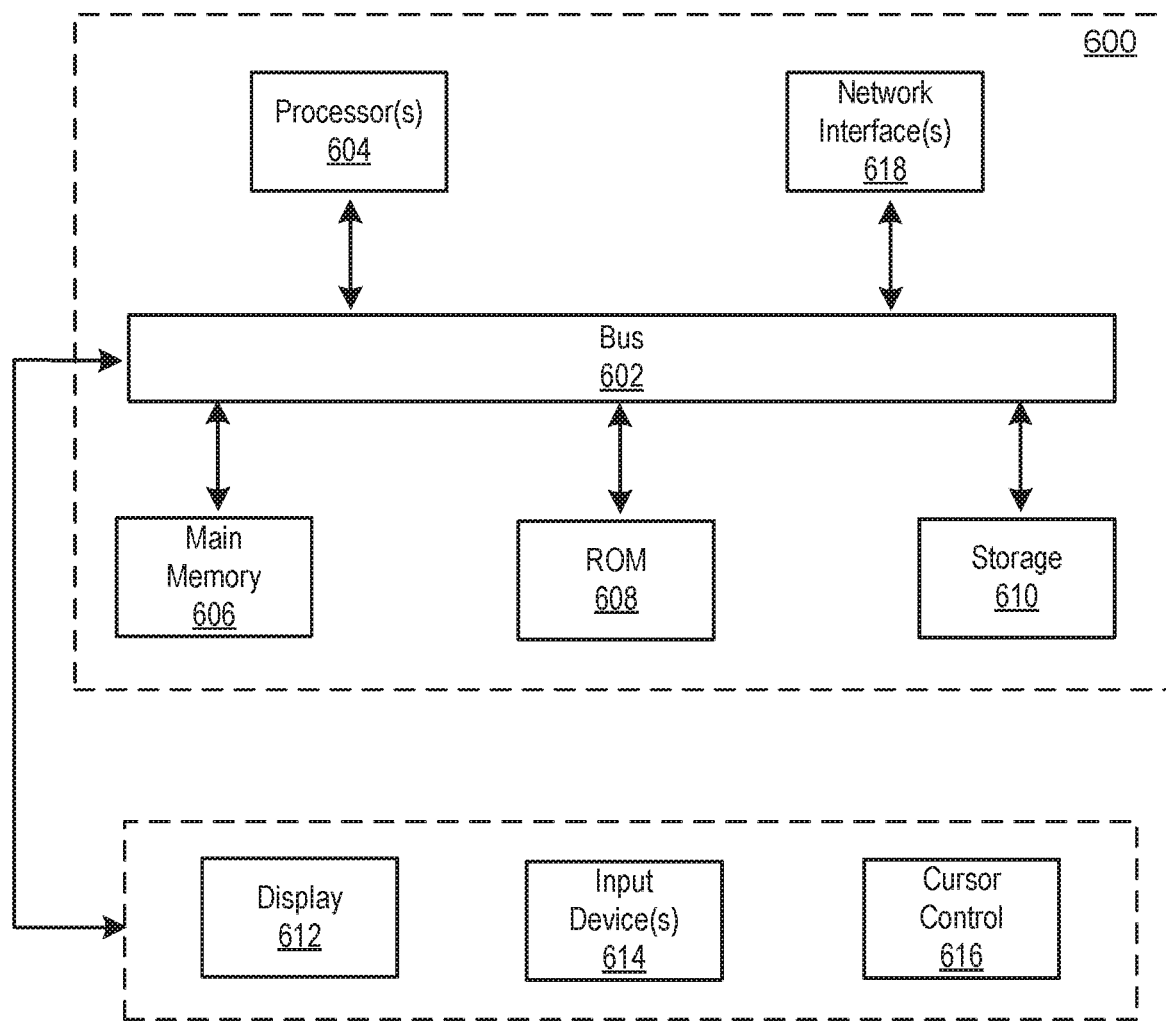
FIG. 6 depicts a block diagram of an example computer system in which any of the embodiments described herein may be implemented.

FIG. 6 depicts a block diagram of an example computer system 600 in which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may retrieves and executes the instructions. The instructions received by main memory 606 may optionally be stored on storage device 610 either before or after execution by processor 604.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses, and advantages of the invention will be apparent to those skilled in the art from consideration of the specification and practice of the invention disclosed herein. The specification should be considered to describe examples only, and the scope of the invention is accordingly intended to be limited only by the following claims.

What is claimed is:

1. A system for tracking and enforcing relationships between items, the system comprising:
    one or more processors; and
    a memory storing instructions that, when executed by the one or more processors, cause the system to:
        receive a user access request comprising an identification of a user;
        obtain, based on the identification of the user, a first item and a second item accessible by the user;
        display an interface comprising one or more nodes representing the first item and the second item, wherein each of the one or more nodes comprises a selectable component;
        receive a first selection of the one or more nodes representing the first item and the second item;
        display a set of predefined link candidates each defining a relationship between the first item and the second item;
        receive user input comprising:
            a link between the first item and the second item selected from the set of predefined link candidates; and
            one or more relationship parameters of the link defining one or more rules to be enforced with respect to usage of the first item or the second item;
        identify at least one violation of the one or more rules;
        cause a first visualization of the at least one violation to be provided via the interface, wherein the first visualization is selectable;
        receive a second selection of a violation of the at least one violation; and
        cause a second visualization of:
            a description of the selected violation; and
            one or more items, selected from the first item and the second item, causing the selected violation.

2. The system of claim 1, wherein the first item and the second item each comprise at least one of a data object, a dataset, an application, a folder, a report, or a resource.

3. The system of claim 1, wherein the system is further caused to:
    identify a new item comprising a data object, the data object utilizing the first item or the second item;
    determine that the new item violates at least one of the one or more rules; and
    responsive to the determination that the new item violates at least one of the one or more rules, cause an error message to be provided via the user interface.

4. The system of claim 3, wherein the instructions further cause the system to prevent the new data object from being committed based on the determination that the new item violates at least one of the one or more rules.

5. The system of claim 1, wherein the link between the first item and the second item indicates that the first item is a parent of the second item, and wherein the one or more rules require each modification to the first item to be reflected in the second item.

6. The system of claim 1, wherein the link between the first item and the second item indicates that the first item is a subset of the second item, and wherein the one or more rules require the second item to include the entirety of the first item, wherein to identify the at least one violation of the one or more rules, the system is further caused to:
    identify at least a portion of the first item that is not included within the second item; and
    determine that at least the first item or the second item violates the one or more rules based on the identification of at least the portion of the first item that is not included within the second item, wherein the visualization of the at least one violation provided via the user interface includes an indication of the identified portion of the first item that is not included within the second item.

7. The system of claim 1, wherein the first item comprises an object representing a set of users and the second item comprises a project, wherein the link between the first item and the second item indicates that the set of users is restricted from accessing items associated with the project, wherein the one or more rules restrict access to the project by the set of users, and wherein to identify the at least one violation of the one or more rules, the system is further caused to:
   determine that a first user of the set of users is requesting access to at least one item associated with the project; and
   identify the at least one violation of the one or more rules based on the determination that the first user is requesting access to the at least one item associated with the project.

8. A method being implemented by a computing system having one or more processors and storage media storing machine-readable instructions that, when executed by the one or more processors, cause the computer system to perform the method, the method comprising:
   receiving a user access request comprising an identification of a user;
   obtaining, based on the identification of the user, a first item and a second item accessible by the user;
   displaying an interface comprising one or more nodes representing the first item and the second item, wherein each of the one or more nodes comprises a selectable component;
   receiving a first selection of the one or more nodes representing the first item and the second item;
   displaying a set of predefined link candidates each defining a relationship between the first item and the second item;
   receiving user input comprising:
      a link between the first item and the second item selected from the set of predefined link candidates; and
      one or more relationship parameters of the link defining one or more rules to be enforced with respect to usage of the first item or the second item;
   identifying at least one violation of the one or more rules;
   causing a first visualization of the at least one violation to be provided via the interface, wherein the first visualization is selectable;
   receiving a second selection of one of the at least one violation; and
   causing a second visualization of:
      a description of the selected violation; and
      one or more items, selected from the first item and the second item, causing the selected violation.

9. The method of claim 8, wherein the first item and the second item each comprise at least one of a data object, a dataset, an application, a folder, a report, or a resource.

10. The method of claim 8, the method further comprising:
   identifying a new item comprising a data object, the data object utilizing the first item or the second item;
   determining that the new item violates at least one of the one or more rules; and
   responsive to the determination that the new item violates at least one of the one or more rules, causing an error message to be provided via the user interface.

11. The method of claim 10, the method further comprising:
   causing the system to prevent the new data object from being committed based on the determination that the new item violates at least one of the one or more rules.

12. The method of claim 8, wherein the link between the first item and the second item indicates that the first item is a parent of the second item, and wherein the one or more rules require each modification to the first item to be reflected in the second item.

13. The method of claim 8, wherein the link between the first item and the second item indicates that the first item is a subset of the second item, and wherein the one or more rules require the second item to include the entirety of the first item, wherein identifying the at least one violation of the one or more rules comprises:
   identifying at least a portion of the first item that is not included within the second item; and
   determining that at least the first item or the second item violates the one or more rules based on the identification of at least the portion of the first item that is not included within the second item, wherein the visualization of the at least one violation provided via the user interface includes an indication of the identified portion of the first item that is not included within the second item.

14. The method of claim 8, wherein the first item comprises an object representing a set of users and the second item comprises a project, wherein the link between the first item and the second item indicates that the set of users is restricted from accessing items associated with the project, wherein the one or more rules restrict access to the project by the set of users, and wherein identifying the at least one violation of the one or more rules comprises:
   determining that a first user of the set of users is requesting access to at least one item associated with the project; and
   identifying the at least one violation of the one or more rules based on the determination that the first user is requesting access to the at least one item associated with the project.

15. A non-transitory computer readable medium comprising instructions that, when executed, cause one or more processors to perform:
   receiving a user access request comprising an identification of a user;
   obtaining, based on the identification of the user, a first item and a second item accessible by the user;
   displaying an interface comprising one or more nodes representing the first item and the second item, wherein each of the one or more nodes comprises a selectable component;
   receiving a first selection of the one or more nodes representing the first item and the second item;
   displaying a set of predefined link candidates each defining a relationship between the first item and the second item;
   receiving user input comprising:
      a link between the first item and the second item selected from the set of predefined link candidates; and
      one or more relationship parameters of the link defining one or more rules to be enforced with respect to usage of the first item or the second item;
   identifying at least one violation of the one or more rules;

causing a first visualization of the at least one violation to be provided via the interface, wherein the first visualization is selectable;

receiving a second selection of one of the at least one violation; and causing a second visualization of:
- a description of the selected violation; and
- one or more items, selected from the first item and the second item, causing the selected violation.

16. The non-transitory computer readable medium of claim 15, wherein the instructions further cause the one or more processors to perform:

identifying a new item comprising a data object, the data object utilizing the first item or the second item;

determining that the new item violates at least one of the one or more rules; and responsive to the determination that the new item violates at least one of the one or more rules, causing an error message to be provided via the user interface.

17. The non-transitory computer readable medium of claim 16, wherein the instructions further cause the one or more processors to perform:

causing the system to prevent the new data object from being committed based on the determination that the new item violates at least one of the one or more rules.

18. The non-transitory computer readable medium of claim 15, wherein the link between the first item and the second item indicates that the first item is a parent of the second item, and wherein the one or more rules require each modification to the first item to be reflected in the second item.

19. The non-transitory computer readable medium of claim 15, wherein the link between the first item and the second item indicates that the first item is a subset of the second item, and wherein the one or more rules require the second item to include the entirety of the first item, wherein identifying the at least one violation of the one or more rules comprises:

identifying at least a portion of the first item that is not included within the second item; and determining that at least the first item or the second item violates the one or more rules based on the identification of at least the portion of the first item that is not included within the second item, wherein the visualization of the at least one violation provided via the user interface includes an indication of the identified portion of the first item that is not included within the second item.

20. The non-transitory computer readable medium of claim 15, wherein the first item comprises an object representing a set of users and the second item comprises a project, wherein the link between the first item and the second item indicates that the set of users is restricted from accessing items associated with the project, wherein the one or more rules restrict access to the project by the set of users, and wherein identifying the at least one violation of the one or more rules comprises:

determining that a first user of the set of users is requesting access to at least one item associated with the project; and identifying the at least one violation of the one or more rules based on the determination that the first user is requesting access to the at least one item associated with the project.

\* \* \* \* \*